Nov. 14, 1967  E. K. CABLE  3,353,071
SWITCH DEVICE
Filed Nov. 19, 1964
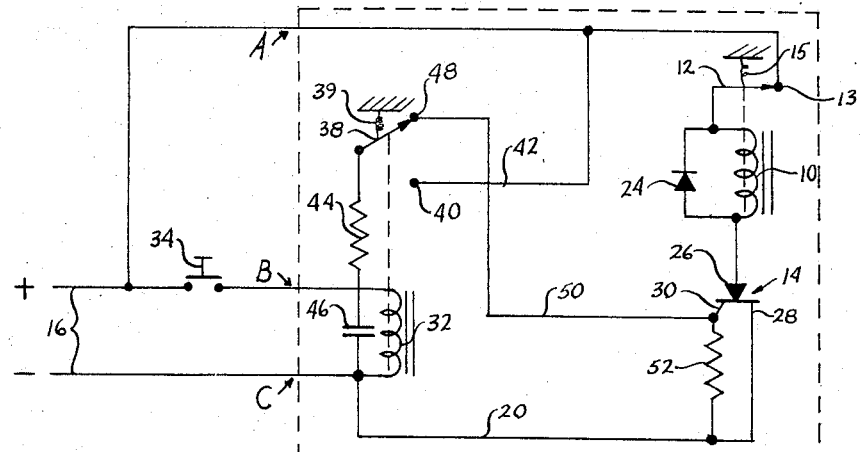
FIG. 1
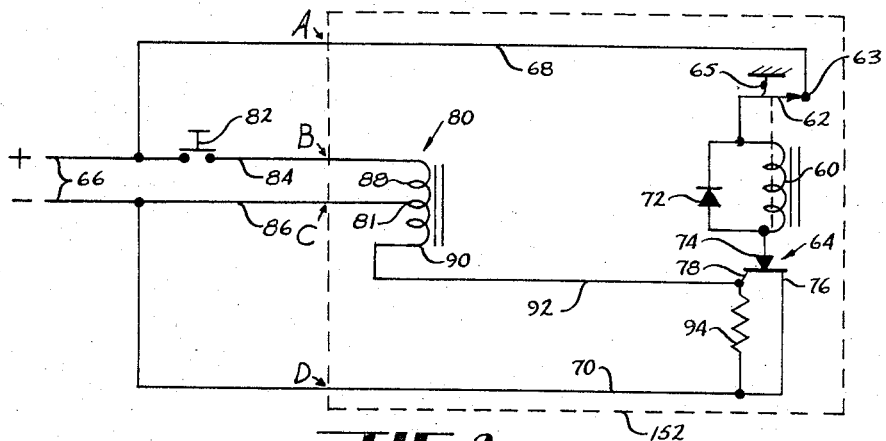
FIG. 2
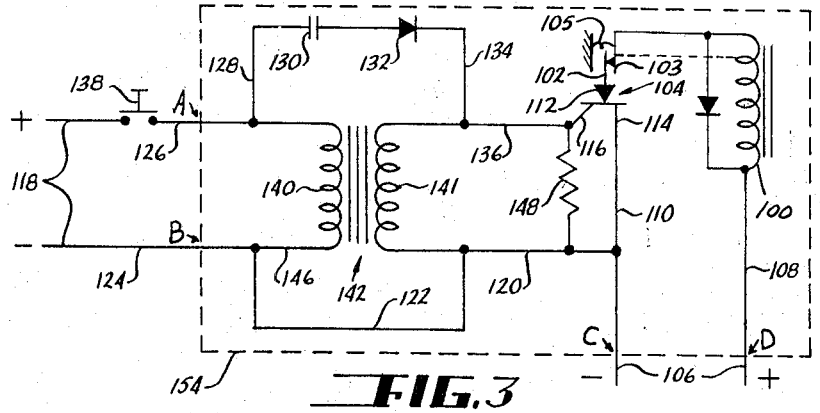
FIG. 3
INVENTOR.
ELVIN K. CABLE
BY
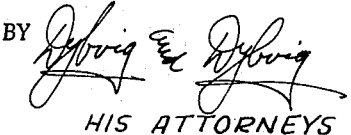
HIS ATTORNEYS

United States Patent Office 3,353,071
Patented Nov. 14, 1967

3,353,071
SWITCH DEVICE
Elvin Keith Cable, New Carlisle, Ohio, assignor to Ledex, Inc., Dayton, Ohio, a corporation of Ohio
Filed Nov. 19, 1964, Ser. No. 412,438
5 Claims. (Cl. 317—148.5)

ABSTRACT OF THE DISCLOSURE

An electrical circuit for inverting the operation of switches. On making switch contact the circuit sets up to later initiate load operation by accomulating a charge of electrical energy. On subsequent breaking of switch contact the accumulated energy is discharged to the gate of a controlled rectifier which then conducts power to the load.

---

This invention relates to a switch device and more particularly to an inverted switch device wherein power is supplied to a load upon the opening of switch contacts in contrast to the more conventional type of switching operation wherein power is supplied to the load upon the closing of the switch contacts.

In the conventional switch operation, such as for the application of electrical power to an electrical appliance, the control switch is actuated to a closed position and in response to such actuation electrical power is supplied to the electrical appliance. There is a demand however for switches which will operate in an inverted fashion. Thus for some applications a switch is needed wherein closure of the switch contacts does not result in immediate operation of the load but rather merely prepares a control circuit for delivery of power to the load after the control switch contacts have been opened. Such inverted switch devices, when used, are generally employed in circuits wherein the load, upon operation thereof, interrupts its own power supply so as to turn itself off.

An object of the present invention is to provide a new and improved inverted switch device.

Another object of the present invention is to provide an improved inverted switch control in which moving parts have been minimized and, for some operations eliminated.

Still another object of the present invention is to provide an improved two-step switch control circuit wherein delivery of power to a load is initiated upon closure of a switch and repeated upon opening of the switch.

Other objects and advantages reside in the construction of parts, the combination thereof, the method of manufacture and the mode of operation, as will become more apparent from the following description.

In the drawing, FIGURE 1 is a circuit diagram illustrating one embodiment of the present invention.

FIGURE 2 is a circuit diagram of a first modification.

FIGURE 3 is a circuit diagram of a second modification.

In each of the three disclosed embodiments of the present invention a controlled rectifier which is preferably a silicon controlled rectifier is used to regulate the flow of current through a load. In each case, current flow through the load is initiated by supplying a positive pulse to the control gate for the controlled rectifier. The three embodiments illustrated differ in the control circuit means by which a positive pulse is formed and controllably supplied to the controlled rectifier.

In the embodiment of FIGURE 1, the present invention is employed to control the electrical power supplied to a load coil 10, which is in the form of an inductance coil adapted to control the position of a switch element 12. The load coil 10 and switch element 12 operate as a relay. A specific example of a load to which the present invention is particularly well suited is the Magnetically Operated Device disclosed in United States Patent No. 2,496,880 issued to G. H. Leland, Feb. 7, 1950. The magnetically operated device of that patent includes a solenoid coil surrounding a ferromagnetic core to form an electromagnet which, when energized, drives an armature through a rotary stroke suitable for the operation of one or more switch elements.

In the present embodiment the load coil 10 and the switch element 12 which responds thereto are placed in series with a controlled rectifier 14 and a source of voltage 16. The switch element 12 is biased by a spring 15 to engagement with a contact 13, the arrangement being such that the switch element 12, upon energization of the coil 10 will interrupt the supply of power to the load coil 10 by separation from the contact 13.

The controlled rectifier 14 includes an anode 26, a cathode 28, and a control gate 30. As is well understood in the art, the controlled rectifier 14 is a substantial nonconductor between its cathode and anode until a positive voltage pulse of sufficient magnitude has been supplied to the control gate element 30. Thus in the absence of a positive pulse being supplied to the control gate element 30, no current flows through the load coil 10.

The delivery of a positive pulse to the controlled rectifier 14 is accomplished by means of a control circuit including a relay coil 32 placed across the voltage supply 16 and subject to the control of a manual switch 34. The relay coil 32 controls the position of a switch element 38 which, when the relay coil is de-energized, is biased into engagement with a contact 48 by a return spring 39.

Upon closure of the switch 34 so as to energize the relay coil 32, switch element 38 is drawn against contact 40 by the magnetic field of the relay coil 32 thereby connecting a resistance 44 and capacitor 46 across the voltage supply through the conductor 42. This charges the capacitor 46. Closure of the switch 34 therefore results only in a charging of the capacitor 46.

The switch 34 is preferably a spring biased push button switch which, when released, interrupts the supply of power to the relay coil 32. As mentioned, the switch element 38 is biased to return to engagement with the contact 48 upon collapse of the field associated with the relay coil 32. Accordingly, opening of the switch 34 results in a return of the self-returning switch element 38 to the contact 48. This couples the capacitor 46 and the resistor 44 across the control gate-cathode circuit of the controlled rectifier through the conductors 20 and 50. This discharge circuit connection enables discharge of the capacitor 46 through the control gate element of the controlled rectifier with the result that the control gate 30 receives a positive voltage pulse.

The passage of a positive voltage pulse through the control gate 30 establishes a low resistance current path between the cathode and the anode of the controlled rectifier 14, with the result that substantially the full voltage of the supply 16 is applied to the load coil 10. This results in development of a magnetic field about the load coil 10 which moves switch element 12 away from the contact 13 so as to interrupt the supply of power to the load 10.

Upon interruption of the supply of power to the load 10, the conductive path between the anode and cathode of the controlled rectifier 14 is extinguished with the result that the field about the load 10 collapses and the switch element 12 returns to its contact 13. A rectifying diode 24 is placed across the load coil 10 to facilitate field collapse about the load after each operation thereof.

Reviewing the operation of the foregoing circuit, closure of the switch 34 results in decoupling of the capacitor 46 from the control gate element and in charging of the capacitor 46. Subsequent opening of switch 34 results in coupling of the capacitor 46 to the control gate element and discharge of the capacitor 46 through the control gate element with consequent operation of the load coil 10. Once placed in operation, the load coil 10 interrupts its own power supply by operation of the switch element 12.

The resistance 52 connected between the control gate element 30 and the cathode 28 is not an essential element in the circuit, but is provided to lower the sensitivity of the control gate 30 to spurious voltage pulses.

Substantially the same operation obtained in the preceding embodiment can be obtained without moving parts other than the control switch element with the modification of FIGURE 2. In this modification the load 60 is again an inductance coil which controls the operation of a switch element 62 normally biased to engagement with a contact 63 by a spring 65. The load coil 60 and the switch element 62 responsive thereto are placed in series with a controlled rectifier 64 across a voltage supply 66 using conductors 68 and 70. A rectifying diode 72 is placed across the load coil 60 to permit the discharge thereof upon interruption of the supply of power thereto.

The controlled rectifier 64 has an anode 74, a cathode 76 and a control gate element 78. As previously discussed this silicon controlled rectifier prevents a flow of current through the load 60 until a positive pulse has been applied to its control gate element 78.

In this first modification, the positive pulse for triggering the controlled rectifier is developed by a control circuit including an inductance coil or transformer 80 having a center tap 81. A portion 88 (transformer primary) of the coil 80 is adapted to receive electrical energy from the voltage supply 66 subject to the control of a switch 82 through conductors 84 and 86, the conductor 86 connecting with the center tap to the coil 80. Upon closure of the switch 82 the portion 88 of the coil 80 is charged directly by the voltage supply 66 and, by mutual inductance, the remaining portion 90 (transformer secondary) of the coil 80 is also charged.

The remaining portion 90 of the coil 80 is placed across the control gate-cathode circuit of the controlled rectifier 64 by conductors 70 and 92. At the time the portion 90 of the coil 80 charges by mutual inductance with the portion 88 a negative pulse is applied to the control gate element 78. This pulse being negative does not change the resistive path between the anode and cathode of the controlled rectifier.

At such time as the switch 82 is released so as to interrupt the supply of power to the portion 88 of the coil 80, the field around the portion 88 collapses and simultaneously therewith the field around the portion 90 of the coil 80 collapses. The collapse of the field about the portion 90 produces a positive pulse through the control gate element 78 which will establish a highly conductive current path between the anode and cathode of the controlled rectifier 64. The resistance 94 placed across the control gate and the cathode of the controlled rectifier is again not necessary to operation of the first modification but is found desirable for purposes of stability.

With establishment of a conductive path through the anode and cathode of the controlled rectifier 64, the load 60 is energized and, as a consequence, the switch element 62 is pulled away from its contact 63. This interrupts the supply of power to the load 60 and accordingly extinguishes the conductive path between the anode and cathode of the controlled rectifier 64. The load 60 then discharges through the diode 72.

Summarizing the operation of the first modification of FIGURE 2, closure of the switch 82 results in charging of the inductance coil 80 without energization of the load 60. Opening of the switch 82 then results in application of a positive pulse to the control gate element 78 of the controlled rectifier and operation of the load 60. Operation of the load 60 induces movement of the switch element 62 thereby interrupting the supply of power to the load 60. In essence then, closure of the switch 82 prepares the coil 80 for operation of the load 60 when the switch 82 is subsequently opened.

For some applications of switch devices embodying the present invention it is desired to produce a two-step switching function wherein power is applied to the load a first time when a control circuit is first energized, and a second time when a control circuit is deenergized. The embodiment of FIGURE 3 accomplishes this function.

In the embodiment of FIGURE 3, the load is again an inductance coil 100 which controls the position of a switch element 102. The switch element 102 is normally biased into contact with the conductor 103 by a suitable biasing means such as the spring 105. The coil 100 with its switch element 102 are connected in series relation with a controlled rectifier 104 across a voltage supply 106 using conductors 108 and 110. As previously discussed the load 100 cannot be energized by the voltage supply 106 until the controlled rectifier 104 has been rendered conductive between its anode and cathode elements 112 and 114, respectively.

To render the controlled rectifier 104 conductive it is necessary to apply a positive pulse to its control gate element 116. A control circuit for supplying two successive positive pulses to the control gate element 116 is provided in this third modification.

The control circuit includes a voltage source 118 which may or may not be in common with the voltage source 106. The negative terminal of the voltage source 118 is connected to the anode 112 of the controlled rectifier 104 by conductors 120, 122 and 124. The positive terminal of the voltage source 118 is connected to the control gate element 116 of the controlled rectifier through conductors 126 and 128, capacitor 130, rectifying diode 132 and conductors 134 and 136, the conductor 126 being subject to the control of an interrupter or control switch 138.

Upon closure of the switch 138, the capacitor 130 is charged by the voltage source 118 with the result that a positive pulse appears at the control gate element 116. This positive pulse establishes high conductivity between the cathode and anode element of the controlled rectifier with the result that the load coil 100 is energized.

Energization of the load coil 100 produces a magnetic field which moves the switch element 102 out of contact with the conductor 103. This interrupts the supply of power to the load coil 100, and extinguishes the high current conductivity in the controlled rectifier 104. Thus, closure of the switch 138 results in a prompt operation of the load coil 100.

Closure of the switch 138 also energizes the primary 140 of a transformer 142 through conductors 124, 126, 144 and 146. The charging of the primary coil 140 also induces a charging of the secondary coil 141. The induced charging of the secondary 141 produces a current flow between the control gate element 116 and the cathode 114 of the controlled rectifier which opposes the positive pulse supplied by charging of the capacitor 130. However, this opposing pulse is insufficient to prevent firing of the controlled rectifier due to charging of the capacitor 130.

Upon opening of the switch 138 after first firing of the controlled rectifier 104, the magnetic field of the secondary 141 of the transformer collapses providing a second positive pulse to the control gate element 116 of the controlled rectifier 104. This causes the load coil 100 to repeat its operating cycle wherein the switch element 102 is separated from the conductor 103 to interrupt the supply of power to the load coil 100. The rectifying diode 132, which may be any unidirectional current carrier, prevents discharge of the transformer secondary into the capacitor 130 with consequent weakening of the pulse to the control gate element.

Summarizing the operation of the embodiment of FIG-

URE 3, closure of the switch 138 in the control circuit for the controlled rectifier 104 results in an immediate firing of the controlled rectifier 104 and in an immediate operation of the load coil 100. Subsequent opening of the control switch 138 results in a second firing of the controlled rectifier 104 and a second cycle of operation for the load coil 100. As previously mentioned a resistance element 148 may be placed across the control gate element 116 and the cathode 114 of the controlled rectifier to improve the stability of the circuit.

In each of the embodiments herein disclosed, the control circuit for the control rectifier has been described as one involving a manually operated control switch. However, it will be recognized by those skilled in the art that the switching means for effecting operation of the control circuit may comprise any suitable circuit means capable of temporarily supplying input voltage to the control circuit. Thus in the embodiment of FIGURE 3, the voltage source 118 and the switch 138 may be replaced by a pulse generator of suitable pulse width, as one example.

In each of the illustrations of the foregoing embodiments, a broken line encloses those elements of the control circuit which might ordinarily be packaged together. Thus in FIGURE 1 a broken line 150 encloses the load coil 10 and its associated switch element 12, the controlled rectifier 14, the relay 32 with its associated switch element 38 and the capacitor 46 which accumulates and stores the positive pulse for firing the controlled rectifier. This package has three terminals A, B, and C, the terminals A and C serving as voltage input terminals to the load 10, and the terminals B and C serving as voltage input terminals to the control circuit for firing the controlled rectifier. As previously stressed, the control circuit may be subject to manual control such as symbolized by the switch 34 of FIGURE 1, or may be subject to the control of other circuitry, not shown, capable of supplying a temporary voltage across the terminals B and C. Clearly the voltage supplied across the terminals B and C need not originate from the same source as the voltage supplied across the terminals A and C.

In the first modification of FIGURE 2, a broken line 152 encloses those circuit elements which might be packaged together. Thus the broken line 152 encloses the load coil 60 and its associated switch element 62, the controlled rectifier 64 and the transformer coil 80. In this particular embodiment, the resultant package has four input terminals A, B, C and D. Terminals A and D provide the voltage input terminals for the load 60. Terminals B and C provide the voltage input terminals for the control circuit which fires the controlled rectifier 64. Here again it is clear that the voltage applied across the terminals A and D need not originate from the same source as the voltage applied across the terminals B and C. Further it will be recognized by those skilled in the art that any suitable means for interrupting the voltage applied across the terminals B and C may be employed.

In the embodiment of FIGURE 3, a broken line 154 encloses those circuit elements which might be packaged together, such elements being the load coil 100 and its associated switch element 102, the controlled rectifier 104, the capacitor 130 which forms the first pulse to the controlled rectifier, and the transformer 142 which forms the second pulse to the controlled rectifier.

The particular package indicated in FIGURE 3, has four input terminals A, B, C and D, the terminals C and D serving as voltage input terminals for the load 100 and the terminals A and B serving as voltage input terminals for the control circuit which fires the controlled rectifier 104. Here again it will be apparent to those skilled in the art that the source of voltage applied to the terminals A and B may or may not be in common with the source of voltage applied to the terminals C and D. It will also be apparent that a wide variety of techniques for interrupting the voltage applied to the control circuit exist in the prior art.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A device for regulating the delivery of electrical energy to a load, said device including, in combination: a controlled rectifier having an anode, a cathode and a control gate element, conductor means to connect said anode and cathode in series with said load and with a voltage source for operating said load, and control circuit means adapted to receive a voltage temporarily supplied thereto; said control circuit means including a first inductance coil to receive said temporarily supplied voltage, a second inductance coil inductively coupled to said first coil, and discharge circuit means coupling said second coil with said control gate element, said discharge circuit means transmitting a voltage pulse from said second coil to said control gate element upon removal of said temporarily supplied voltage.

2. A device for regulating the delivery of energy to a load, said device including, in combination: a controlled rectifier having an anode, a cathode and a control gate element, conductor means to connect said anode and cathode in series with said load and with a voltage source for operating said load, and control circuit means adapted to receive a voltage temporarily supplied thereto; said control circuit means including a first inductance coil, a second inductance coil inductively coupled to said first coil, said second inductance coil responding to energization of said first inductance coil to accumulate electrical energy, and discharge circuit means connecting said second inductance element across said cathode and control gate elements of said controlled rectifier and transmitting a voltage pulse from said second inductance coil to said control gate element upon removal of said temporarily supplied voltage.

3. In combination, switch means switchable between an open condition and a closed condition and circuit means responsive to sequential closing then opening of said switch means to supply power to a load upon opening of said switch means, said circuit means comprising: a controlled rectifier having an anode, a cathode and a control gate element, first conductor means to connect said anode and cathode in series with said load and with a voltage source effective to operate said load, a relay coil, second conductor means to connect said coil and said switch means across a source of power whereby said switch means energizes said coil from said source of power in said closed condition, a relay switch element biased to a first position and responding to energization of said relay coil to move against said bias to a second position, chargeable means, third conductor means to connect said chargeable means between one side of said voltage source and said switch element, said switch element in said first position engaging said gate element and in said second position engaging the other side of said voltage source, said switch element in said first position responding to energization of said coil upon closure of said switch means to move to said second position and thereby place said chargeable means across said voltage source and responding to said bias upon opening of said switch means to return to said first position and thereby discharge said chargeable means to said gate element, said discharge rendering said controlled rectifier conductive between its anode and cathode elements and thereby operating said load from said voltage source.

4. The combination of claim 3 wherein said chargeable means comprises a capacitance element.

5. A device for supplying two successive voltage applications to a load comprising, in combination, a controlled rectifier having an anode, a cathode, and a control gate element, first conductor means to connect said anode and cathode in series connection with said load and with a voltage source for operating said load, self returning means responsive to operation of said load to interrupt and then restore said series connection upon operation of said load, and control circuit means adapted to receive a voltage temporarily supplied thereto and to supply two successive voltage pulses to said control gate element each effective to fire said controlled rectifier, said control circuit means including capacitance means connected to be charged by said temporarily supplied voltage, second conductor means coupling said capacitance means with said control gate element in such polarity that said charging of said capacitance means produces a first voltage pulse in said control gate element effective to fire said controlled rectifier and thereby operate said load, said self returning means responding to said operation of said load to interrupt said series connection and thereby quench said controlled rectifier, an inductance element connected to be charged by said temporarily supplied voltage, a second inductance element inductively coupled to said first inductance element, and discharge circuit means coupling said second inductance element to said control gate element in such polarity that removal of said temporarily supplied voltage results in a second voltage pulse through said control gate element from said second inductance element effective to fire said controlled rectifier a second time, said first conductor means including a unidirectional current carrier effective to prevent discharge of said second inductance element to said capacitance means.

References Cited

UNITED STATES PATENTS 3,260,898  7/1966  Jones _____ 317—135
3,286,131  11/1966  Myers _____ 317—148 X

OTHER REFERENCES

RCA Technical Notes, No. 503, March 1962, Stepper Driver Circuit, Harry W. Burke.

MILTON O. HIRSHFIELD, *Primary Examiner.*

LEE T. HIX, *Examiner.*

J. A. SILVERMAN, *Assistant Examiner.*